United States Patent
Vissa et al.

(10) Patent No.: US 10,064,029 B1
(45) Date of Patent: Aug. 28, 2018

(54) METHODS FOR PEER-TO-PEER CONNECTION

(71) Applicant: Motorola Mobility LLC, Chicago, IL (US)

(72) Inventors: Sudhir Vissa, Bensenville, IL (US); Ranjeet Gupta, Chicago, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 0 days.

(21) Appl. No.: 15/644,513

(22) Filed: Jul. 7, 2017

(51) Int. Cl.
| | |
|---|---|
| *H04W 4/14* | (2009.01) |
| *H04L 29/08* | (2006.01) |
| *H04W 8/00* | (2009.01) |
| *H04W 76/14* | (2018.01) |
| *H04W 4/80* | (2018.01) |
| *H04W 84/12* | (2009.01) |
| *H04W 88/02* | (2009.01) |
| *H04W 88/08* | (2009.01) |

(52) U.S. Cl.
CPC .............. *H04W 4/14* (2013.01); *H04L 67/104* (2013.01); *H04W 4/80* (2018.02); *H04W 8/005* (2013.01); *H04W 76/14* (2018.02); *H04W 84/12* (2013.01); *H04W 88/02* (2013.01); *H04W 88/08* (2013.01)

(58) Field of Classification Search
CPC ... H04W 8/005; H04W 76/023; H04W 48/16; H04W 92/18; H04W 4/008; H04W 12/06; H04W 76/02; H04W 28/18; H04W 52/0245; H04W 72/0406; H04W 80/04; H04W 80/06; H04W 4/14; H04W 4/80; H04W 76/14; H04W 84/12; H04W 88/02; H04W 88/08; H04L 67/104; H04L 63/061; H04L 67/1061; H04L 67/125; H04B 7/0619; H04M 1/7253; H04M 2250/06; H04N 21/43637; H04N 21/44227

See application file for complete search history.

(56) References Cited

U.S. PATENT DOCUMENTS

| | | | | |
|---|---|---|---|---|
| 9,629,153 | B2 * | 4/2017 | HomChaudhuri | .... H04W 24/08 |
| 2012/0087356 | A1 * | 4/2012 | Wentink | .............. H04L 12/2859 370/338 |
| 2014/0362728 | A1 * | 12/2014 | Krochmal | ................ H04B 7/26 370/254 |
| 2015/0016321 | A1 * | 1/2015 | Miryala | ............ H04W 52/0209 370/311 |
| 2016/0330757 | A1 * | 11/2016 | Cherian | ............ H04W 72/1268 |
| 2017/0006117 | A1 * | 1/2017 | Kafle | .................... H04B 17/318 |
| 2017/0171895 | A1 * | 6/2017 | Kandagadla | .......... H04W 24/08 |

OTHER PUBLICATIONS

Janevski, T. et al., AAA Solution for Interworking between Mobile Networks and Wireless LANs, Proceedings of the 8th International Conference on Telecommunications—ConTEL 2005, Zagreb, Croatia, Jun. 2005, pp. 231-237.

* cited by examiner

Primary Examiner — Nizar Sivji

(57) ABSTRACT

Methods are disclosed for connecting devices over peer-to-peer connections. An example method includes: sending first wireless network information and first peer-to-peer information from a first device to a second device; comparing the first wireless network information and a second wireless network information; sending a second peer-to-peer information from the second device to the first device, if the first and second wireless network information match; and attempting a peer-to-peer connection between the first device and the second device based on the first and second peer-to-peer information.

18 Claims, 3 Drawing Sheets

METHODS FOR PEER-TO-PEER CONNECTION

TECHNICAL FIELD

This invention relates to peer-to-peer networking and, more specifically, to methods for peer-to-peer connection.

BACKGROUND

Electronic devices, such as smartphones, tablet computers, wearable devices, and Internet-of-things devices, have become ubiquitous. The electronic devices often wirelessly communicate with remote servers and/or other devices over various types of networks and connections, such as wireless local area networking (WLAN) (e.g., Wi-Fi, etc.), wireless wide area networking (WWAN) (e.g., LTE, CDMA, GSM, etc.), and personal area networking (PAN) (e.g., Bluetooth, ZigBee, etc.). The wireless communication between devices is an increasingly important aspect of modern technology. Data may be transmitted and received by the electronic devices in order to facilitate the use of the electronic devices. For example, users of electronic devices may be able to communicate using email, phone calls, SMS, etc. by receiving and transmitting data via a connection.

Such communication can be via a variety of means over different types of networks. For example, devices may communicate via SMS over a wide area network, via a wireless local area network, or via a PAN or peer-to-peer network. In the case of peer-to-peer networks, devices communicate directly with each other (i.e., a message is sent directly from a first device to a second device without any intermediate steps). In order for devices to establish a peer-to-peer connection, the devices must first discover each other. With currently used methods, devices often cannot discover each other until they are on a common network or by periodically scanning for other devices. However, this can impact battery life on the devices and/or the efficiency of wireless medium. Further, discovery may fail for other reasons including electromagnetic interference, a captive portal on a common access point, firewalls, failure of multicast response, restriction of multicast/broadcast packets by a RADIUS controller, etc.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

A method of establishing a connection between two devices includes sending wireless connectivity information and peer-to-peer information from the first device to the second device over a network. The second device compares the wireless connectivity information from the first device to its own wireless connectivity information. If the information matches the second device sends its peer-to-peer information to the first device and the first device and second device attempt a peer-to-peer connection.

Another method of establishing a connection between two devices includes sending peer-to-peer information from the first device to the second device over a network. The second device then sends its peer-to-peer information to the first device. The first device and the second device then establish a peer-to-peer connection using the peer-to-peer information.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1A:
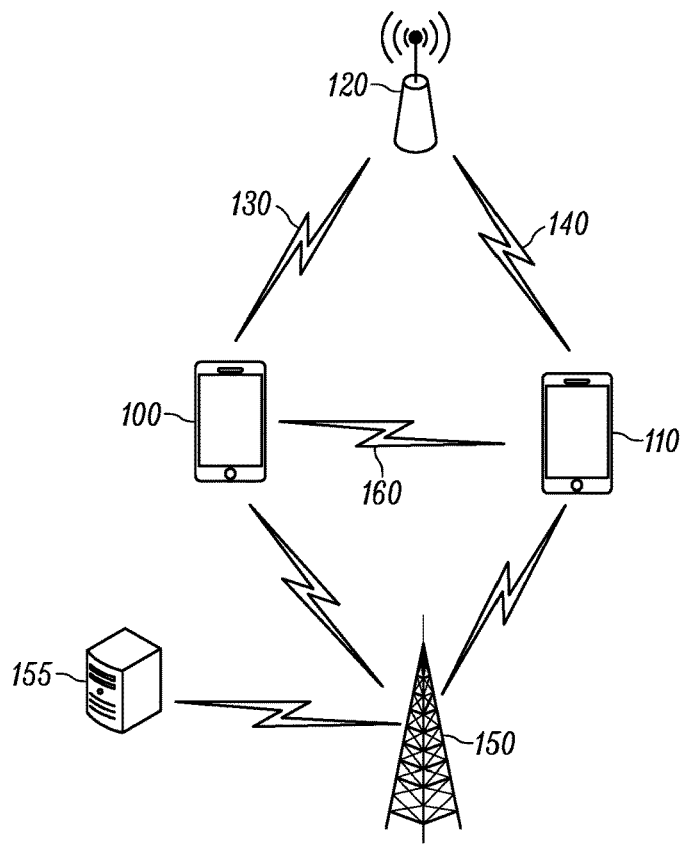
FIG. 1A is a physical depiction of an example peer-to-peer connection attempt for devices sharing an access point.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As disclosed in more detail below, example methods are provided for attempting a peer-to-peer connection. Devices using the example methods may have an increased battery life because it would not be necessary to periodically scan for other devices to connect to. In addition, the connection between devices may be faster if the devices are connected via a peer-to-peer connection, instead of a connection through an external network. Devices wishing to establish a peer-to-peer connection may use, for example, Short Message Service (SMS) or Unstructured Supplementary Service Data (USSD) to share connectivity information to discover each other and establish a peer-to-peer connection. In some examples, devices wishing to establish a peer-to-peer connection are within range of a common wireless access point. In such examples, the devices determine that their wireless network information matches in order to aid in establishing a peer-to-peer connection.

In other examples, the devices wishing to establish a peer-to-peer connection are not in range of a common wireless access point. The devices may be connected to different wireless access points, or no access points at all. In such examples, the devices exchange peer-to-peer connectivity information, such as Bluetooth media access control (MAC) addresses via, for example, SMS. With this information, the devices are able to scan for each other and, if in range, establish a peer-to-peer connection.

FIG. 1A is a physical depiction of an example peer-to-peer connection attempt for devices 100, 110 sharing an access point 120. A first device 100 and a second device 110 may be within range of and detect and/or be connected to an access point 120 via a first wireless local area connection 130 and a second wireless local area connection 140, respectively. In the illustrated example, the first device 100 and the second device 110 are smartphones. In other examples, the first device 100 and the second device 110 may be any electronic device with wireless communication capabilities, for example, a smart watch or other wearable device, a network-connected appliance, etc. Further, in the illustrated example, the access point 120 is a Wi-Fi access point and the first wireless local area connection 130 and the second wireless local area connection 140 are Wi-Fi connections that comply with IEEE 802.11 standards.

The first device 100 and the second device 110 may additionally be connected via a wide area network 150. For example, the wide area network 150 may be a mobile telephone network such as a 3G, 4G, 4G LTE, and/or WiMAX network. Furthermore, the first device 100 and the second device 110 may be capable of peer-to-peer communication via a peer-to-peer connection 160. For example, the peer-to-peer connection 160 may be a Bluetooth, ZigBee (IEEE 802.15.4), Z-Wave, Wi-Fi Direct, etc. connection.

In the illustrated example, the first device 100 sends first wireless local area network information corresponding to the first wireless local area connection 130, and first peer-to-peer information to the second device 110 via the wide area network 150. For example, the first wireless local area network information and the first peer-to-peer information may be sent via SMS and/or USSD over a 4G LTE network. The first wireless local area network information may include a scan list of wireless local area networks in range, the service set identifier (SSID) corresponding to the first wireless local area connection 130, the basic service set identifier (BSSID) corresponding to the first wireless local area connection 130, and/or the MAC address of the access point 120, etc. The first peer-to-peer information may be, for example, the Bluetooth MAC address of the first device 100.

Upon receiving the first wireless local area network information and the first peer-to-peer information, the second device 110 compares the first wireless local area network information to second wireless local area network information corresponding to the second wireless local area connection 140. For example, the second device 110 may parse an SMS and/or USSD message containing the first wireless local area network information for the SSID and/or BSSID corresponding to the first wireless local area connection 130 and compare them to the SSID and/or BSSID corresponding to the second wireless local area connection 140. If the SSID and/or BSSID corresponding to the first wireless local area connection 130 matches the SSID and/or BSSID corresponding to the second wireless local area connection 140, the second device 110 has found a match. If the SSID and/or BSSID corresponding to the first wireless local area connection 130 does not match the SSID and/or BSSID corresponding to the second wireless local area connection 140, the second device 110 has not found a match. In such instances, the second device 110 may compare the scan lists of the first device 100 and the second device 110. If at least one SSID and/or BSSID on the first device's 100 scan list matches at least one SSID and/or BSSID on the second device's 110 scan list, then the second device 110 has found a match.

If the second device finds a match, the second device 110 sends second peer-to-peer information (e.g., the Bluetooth MAC address of the second device 110) to the first device 100 via the wide area network 150 (e.g., using SMS and/or USSD). Additionally, the second device 110 begins to scan for potential peer-to-peer (e.g., Bluetooth) connections based on the first peer-to-peer information.

Upon receiving the second peer-to-peer information, the first device 100 begins to scan for potential peer-to-peer (e.g., Bluetooth) connections based on the second peer-to-peer information. Accordingly, the first device 100 and the second device 110 may locate each other and attempt to establish a peer-to-peer connection.

If, after a threshold time (e.g., 30 seconds) the first device 100 and second device 110 do not locate each other and establish a peer-to-peer connection, the first device 100 and second device 110 may cease scanning for potential peer-to-peer connections.

Alternatively, for example if the first device 100 and second device 110 do not locate each other within the threshold time and/or establishing a peer-to-peer connection otherwise fails, the first device 100 and the second device 110 may establish a connection via the access point 120. For example, the connection may be a Tunneled Direct Link Setup (TDLS) connection. In some examples, the first device 100 may share (e.g., via the wide area network 150) with the second device 110, or vice-versa, a password and/or other credentials to allow connection to the access point 120.

In some examples, the first device 100 and the second device 110 query and obtain a timestamp from a network time protocol (NTP) server 155. In such examples, the timestamp from the NTP server 155 provides an absolute reference from which the first device 100 and second device 110 can synchronize scanning for potential peer-to-peer connections. Synchronizing based on a timestamp from the NTP server 155 serves to reduce potential synchronization errors resulting from a difference in the internal clocks of the first device 100 and the second device 110.

Figure 1B:
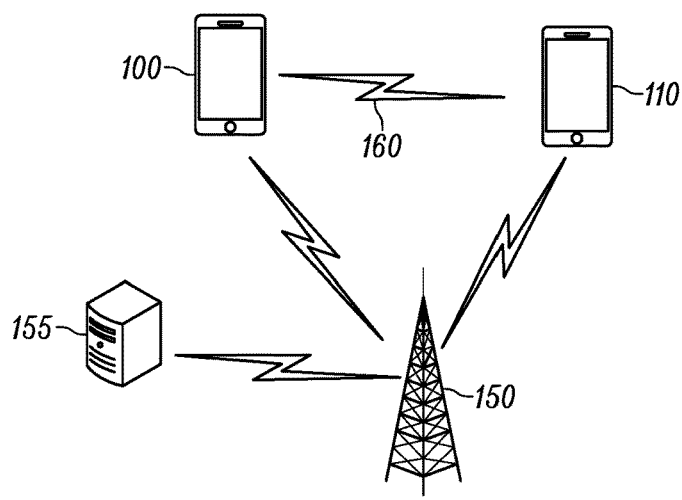
FIG. 1B is a physical depiction of an example peer-to-peer connection attempt for devices not sharing an access point.

FIG. 1B is a physical depiction of an example peer-to-peer connection attempt wherein the first device 100 and the second device 110 do not share and/or are not in range of a common access point. As described above, in the illustrated example, the first device 100 and the second device 110 are smartphones, but may be any electronic device with wireless communication capabilities. The first device 100 and the second device 110 may be connected via the wide area network 150 and/or the peer-to-peer connection 160.

In this example, the first device 100 sends the first peer-to-peer information to the second device 110 via the wide area network 150. For example, the first peer-to-peer information may be sent using SMS and/or USSD.

Upon receiving the first peer-to-peer information, the second device 110 sends, via the wide area network 150 (e.g., using SMS and/or USSD), the second peer-to-peer information to the first device 110. Additionally, the second device 110 begins to scan for potential peer-to-peer (e.g., Bluetooth) connections based on the first peer-to-peer information.

Upon receiving the second peer-to-peer information, the first device 100 begins to scan for potential peer-to-peer (e.g., Bluetooth) connections based on the second peer-to-peer information. Accordingly, the first device 100 and the second device 110 may locate each other and establish a peer-to-peer connection. If, after a threshold time (e.g., 30 seconds) the first device 100 and the second device 110 do not locate each other and establish a peer-to-peer connection, the first device 100 and the second device 110 may cease scanning for potential peer-to-peer connections.

In some examples, the first device 100 and the second device 110 query and obtain a timestamp from the NTP server 155. In such examples, the timestamp from the NTP server 155 provides an absolute reference from which the first device 100 and second device 110 can synchronize scanning for potential peer-to-peer connections. Synchronizing based on a timestamp from the NTP server 155 serves to reduce potential synchronization errors resulting from a difference in the internal clocks of the first device 100 and the second device 110.

Figure 2:
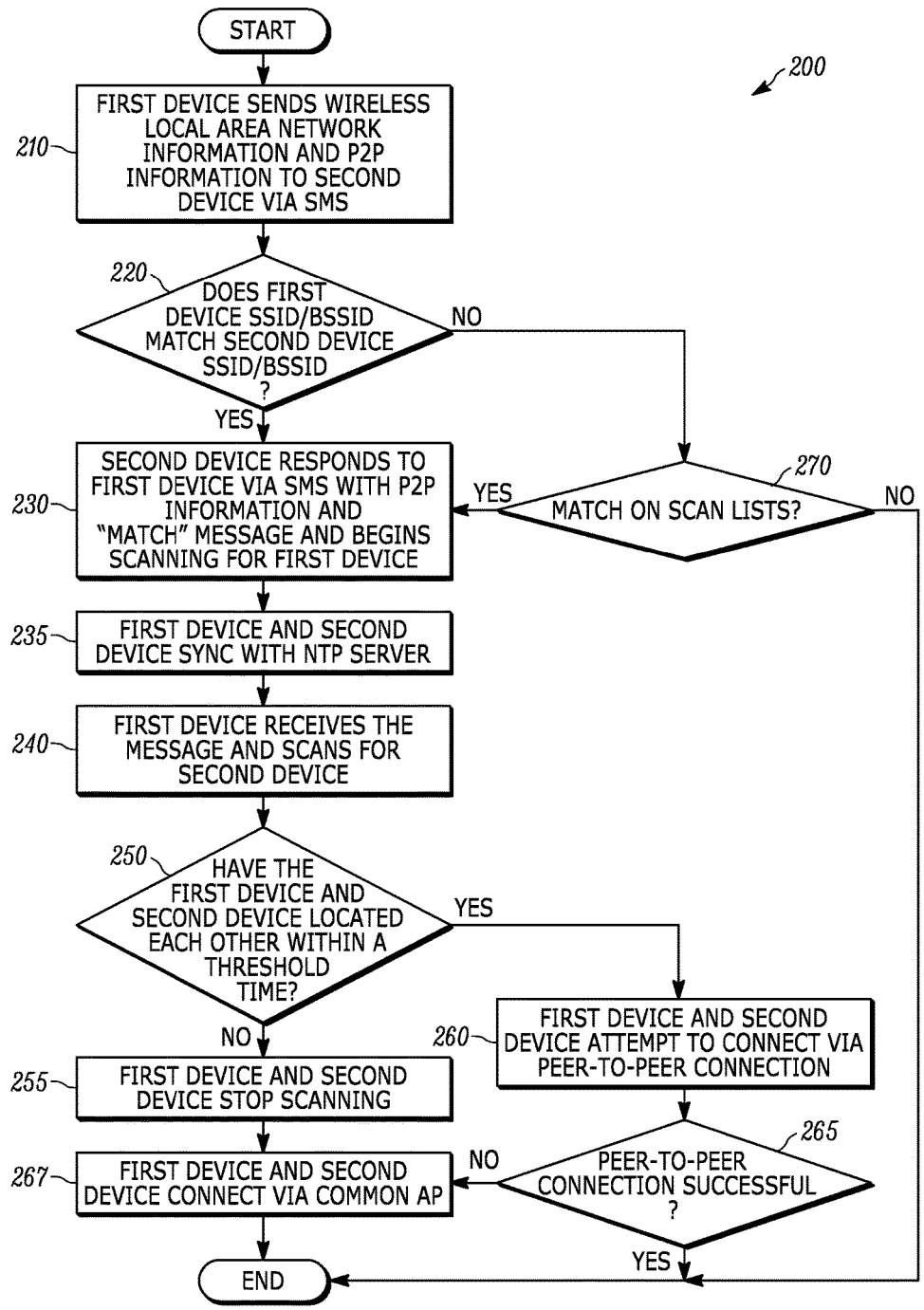
FIG. 2 is a flowchart of an example method for establishing a peer-to-peer connection for devices sharing an access point.

FIG. 2 is a flowchart of an example method 200 for establishing a peer-to-peer connection for devices sharing an access point 120. At block 210, the first device 100 sends the first wireless local area network information and the first peer-to-peer information to the second device 110, via the wide area network 150. In the illustrated example, the first wireless local area network information includes an SSID, BSSID, and scan list and is sent using SMS.

At block 220, the second device 110 receives the first wireless local area network information and the first peer-to-peer information, and compares the SSID and BSSID of the first wireless local area network information to SSID and BSSID of the second wireless local area network information. If the SSID and BSSID of the first wireless local area network information match the SSID and BSSID of the second wireless local area network information, the method 200 proceeds to block 230. Otherwise, the method 200 proceeds to block 270.

At block 270, the second device 110 compares the scan list of the first wireless local area network information to the scan list of the second wireless local area network information. If at least one entry on the scan list of the first wireless local area network information matches at least one entry on the scan list of the second wireless local area network information, the method 200 proceeds to block 230. Otherwise the method 200 ends.

At block 230, the second device 110 sends the first device 100 a message indicating that the first wireless local area network information and the second wireless local area network information match. The message additionally includes the second peer-to-peer information. In the illustrated example, the message is sent using SMS. The second device 110 also begins scanning for the first device 100.

Next, at block 235, the first device 100 and the second device 110 query and obtain a timestamp from the NTP server 155.

Next, at block 240, the first device 100 receives the message from the second device 110 and begins scanning for the second device 110.

Following black 240, at block 250, the first device 100 and the second device 110 determine whether to initiate a peer-to-peer connection or to stop scanning without initiating a peer-to-peer connection. If the first device 100 and the second device 110 have located each other within a threshold time at block 250, then the method 200 proceeds to block 260. For example, the threshold time may be 30 seconds or any suitable time period. If the first device 100 and the second device 110 have not located each other within the threshold time, the method 200 proceeds to block 255.

At block 255, the first device 100 and the second device 110 stop scanning and the method 200 proceeds to block 267.

At block 260, the first device 100 and the second device 110 have located each other within the threshold period. Accordingly, the first device 100 and the second device 110 attempt to connect via a peer-to-peer connection and the method 200 proceeds to block 265.

At block 265, the first device 100 and the second device 110 determine whether to end the method 200 or to connect via a common access point 120. If the peer-to-peer connection (from block 260) is successful, the method 200 ends. Otherwise, the method proceeds to block 267.

At block 267, the first device 100 and the second device 110 connect via a common access point 120, for example via TDLS, and the method 200 ends.

Figure 3:
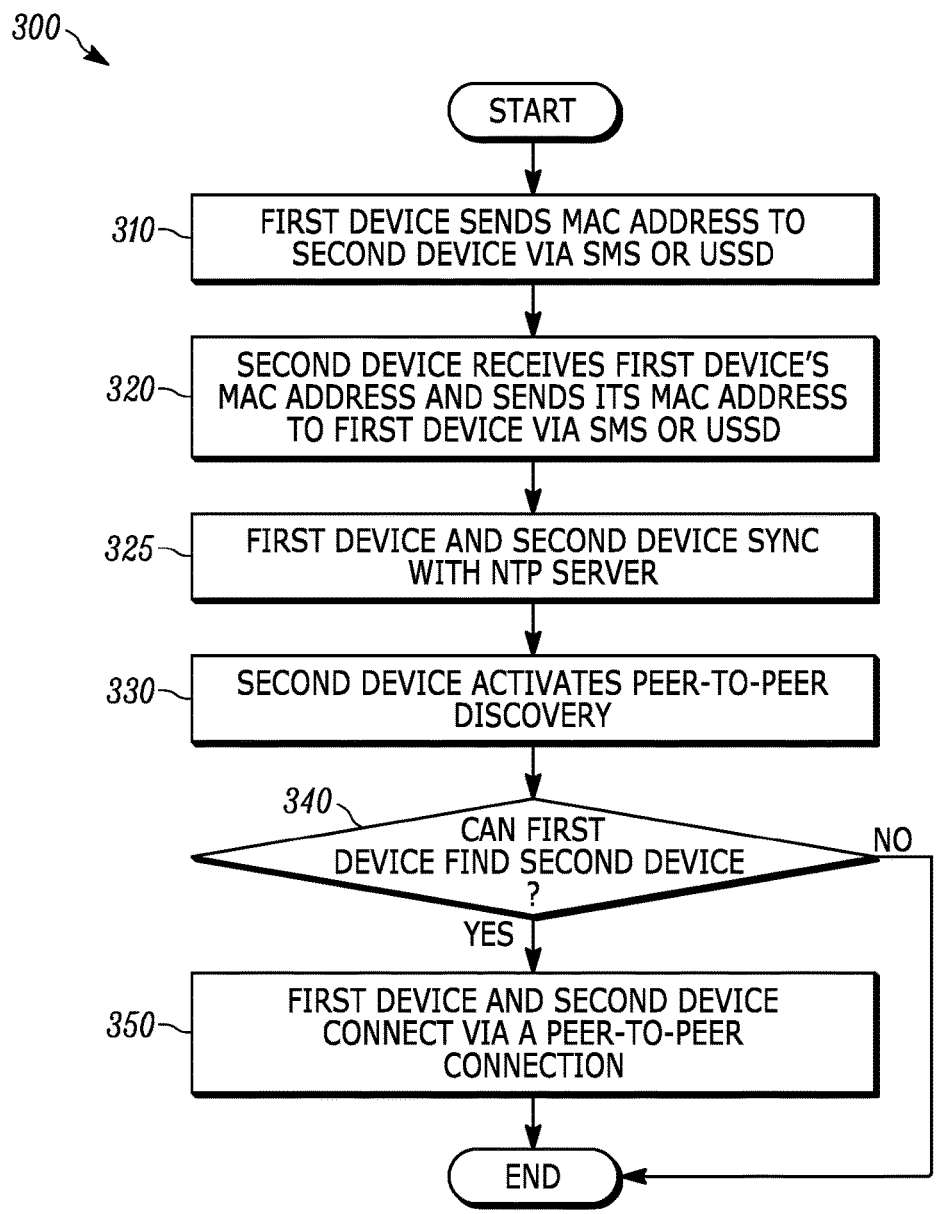
FIG. 3 is a flowchart of an example method for establishing a peer-to-peer connection for devices not sharing an access point.

FIG. 3 is a flowchart of an example method 300 for establishing a peer-to-peer connection for devices not sharing an access point. At block 310, the first device 100 sends the first peer-to-peer information to the second device 110. In the illustrated example, the first peer-to-peer information includes the first device's Bluetooth MAC address and is sent via SMS or USSD.

At block 320, the second device 110 receives the first peer-to-peer information from the first device 100. The second device 110 then sends the second peer-to-peer information to the first device 100. In the illustrated example, the second peer-to-peer information includes the second device's Bluetooth MAC address and is sent via SMS or USSD.

At block 325 the first device 100 and the second device 110 query and obtain a timestamp from the NTP server 155.

At block 330, the second device 110 activates peer-to-peer discovery.

At block 340, the first device 100 scans for the second device 110 and determines if the second device 110 can be found. If the first device 100 can find the second device 110, the method 200 proceeds to block 350. At block 350, the first device 100 and second device 110 connect via a peer-to-peer connection and the method 300 ends. If the first device 100 cannot locate the second device 110 at block 340, then the method 300 ends.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A method, comprising:
sending, from a first device to a second device via a wide area network, first wireless local area network information corresponding to the first device, and first peer-to-peer information corresponding to the first device, wherein the sending of the first wireless local area network information and the first peer-to-peer information is via USSD over a mobile telephone network;
receiving, at the second device, the first wireless local area network information and the first peer-to-peer information via the wide area network;
comparing, at the second device, the first wireless local area network information and second wireless local area network information, wherein the second wireless local area network information corresponds to the second device;
if the first wireless local area network information and the second wireless local area network information match, sending, from the second device to the first device via the wide area network, second peer-to-peer information corresponding to the second device and a message indicating that the first wireless local area network information and the second wireless local area network information match, wherein the sending of the second peer-to-peer information and the message indicating that the first wireless local area network information and the second wireless local area network information match is via USSD over the mobile telephone network;
receiving, at the first device, the message and the second peer-to-peer information; and
attempting a connection between the first device and the second device via a peer-to-peer connection based on the first peer-to-peer information and the second peer-to-peer information.

2. The method of claim 1, wherein:
sending, from the first device to the second device via the wide area network, the first wireless local area network information and the first peer-to-peer information includes sending the first wireless local area network information and the first peer-to-peer information via SMS over a mobile telephone network; and
sending, from the second device to the first device via the wide area network, the message indicating that the first wireless local area network information and the second wireless local area network information match and the second peer-to-peer information includes sending the message indicating that the first wireless local area network information and the second wireless local area network information match and the second peer-to-peer information via SMS over the mobile telephone network.

3. The method of claim 1, wherein the first peer-to-peer information includes a first Bluetooth MAC address and the second peer-to-peer information includes a second Bluetooth MAC address and the peer-to-peer connection is a Bluetooth connection.

4. A method, comprising:
sending, from a first device to a second device via a wide area network, first peer-to-peer information corresponding to the first device, wherein the sending of the first peer-to-peer information is via USSD over a mobile telephone network;
in response to receiving, at the second device, the first peer-to-peer information;
sending, from the second device to the first device via the wide area network, second peer-to-peer information corresponding to the second device, wherein the sending of the second peer-to-peer information is via USSD over the mobile telephone network; and
initiating, at the second device, scanning for a peer-to-peer connection with the first device based on the first peer-to-peer information:
in response to receiving, at the first device, the second peer-to-peer information via the wide area network, initiating, at the first device, scanning for a peer-to-peer connection with the second device based on the second peer-to-peer information; and
in response to the first device finding the second device or the second device finding the first device based on the respective scans for peer-to-Deer connections, establishing a connection between the first device and the second device via a peer-to-peer connection based on the first peer-to-peer information and the second peer-to-peer information.

5. The method of claim 4, wherein:
sending, from the first device to the second device via the wide area network, the first peer-to-peer information corresponding to the first device includes sending, from the first device to the second device via SMS over a mobile telephone network, the first peer-to-peer information corresponding to the first device; and
sending, from the second device to the first device via the wide area network, the second peer-to-peer information corresponding to the second device includes sending, from the second device to the first device via SMS over the mobile telephone network, the second peer-to-peer information corresponding to the second device.

6. The method of claim 4, wherein the first peer-to-peer information includes a first Bluetooth MAC address and the second peer-to-peer information includes a second Bluetooth MAC address and the peer-to-peer connection is a Bluetooth connection.

7. The method of claim 4, wherein the first peer-to-peer information includes a first mobile hot spot MAC address and the second peer-to-peer information includes a second mobile hot spot MAC address.

8. The method of claim 4, wherein the first peer-to-peer information includes a first ZigBee MAC address and the second peer-to-peer information includes a second ZigBee MAC address and the peer-to-peer connection is a ZigBee connection.

9. The method of claim 4, wherein the first peer-to-peer information includes a first Z-Wave MAC address and the second peer-to-peer information includes a second Z-Wave MAC address and the peer-to-peer connection is a Z-Wave connection.

10. The method of claim 4, wherein the first peer-to-peer information includes a first Wi-Fi MAC address and the second peer-to-peer information includes a second Wi-Fi MAC address and the peer-to-peer connection is a Wi-Fi direct connection.

11. A method, comprising:
sending, from a first device to a second device via a wide area network, first wireless local area network information corresponding to the first device, and first peer-to-peer information corresponding to the first device, wherein the first wireless local area network information includes a first BSSID associated with an access point;
receiving, at the second device, the first wireless local area network information and the first peer-to-peer information via the wide area network;
comparing, at the second device, the first wireless local area network information and second wireless local area network information, wherein the second wireless local area network information (1) corresponds to the second device and (2) includes a second BSSID associated with the access point;
if the first wireless local area network information and the second wireless local area network information match, sending, from the second device to the first device via the wide area network, second peer-to-peer information corresponding to the second device and a message indicating that the first wireless local area network information and the second wireless local area network information match, wherein the first wireless local area network information and the second wireless local area network information match if the first BSSID matches the second BSSID;

receiving, at the first device, the message and the second peer-to-peer information; and attempting a connection between the first device and the second device via a peer-to-peer connection based on the first peer-to-peer information and the second peer-to-peer information.

12. The method of claim 11, wherein the first wireless local area network information includes a first scan list associated with the first device and the second wireless local area network information includes a second scan list associated with the second device; and the first wireless local area network information and the second wireless local area network information match if at least one entry on the first scan list matches at least one entry on the second scan list.

13. The method of claim 12, further comprising, if the first wireless local area network information and the second wireless local area network information match and attempting the connection between the first device and the second device via a peer-to-peer connection fails:

establishing a connection between the first device and an access point;

establishing a connection between the second device and the access point; and establishing a connection between the first device and the second device, via the access point.

14. The method of claim 13, further comprising sharing, between the first device and the second device, security credentials corresponding to the access point.

15. The method of claim 13, wherein the connection between the first device and the second device, via the access point, is a TDLS connection.

16. The method of claim 11, wherein the first peer-to-peer information includes a first ZigBee MAC address and the second peer-to-peer information includes a second ZigBee MAC address and the peer-to-peer connection is a ZigBee connection.

17. The method of claim 11, wherein the first peer-to-peer information includes a first Z-Wave MAC address and the second peer-to-peer information includes a second Z-Wave MAC address and the peer-to-peer connection is a Z-Wave connection.

18. The method of claim 11, wherein the first peer-to-peer information includes a first Wi-Fi MAC address and the second peer-to-peer information includes a second Wi-Fi MAC address and the peer-to-peer connection is a Wi-Fi Direct connection.

* * * * *